United States Patent [19]

Marinus

[11] Patent Number: 4,486,822
[45] Date of Patent: Dec. 4, 1984

[54] SWITCHED-MODE SELF OSCILLATING SUPPLY VOLTAGE CIRCUIT

[75] Inventor: Antonius Marinus, Eindhoven, Netherlands

[73] Assignee: U.S. Philips Corporation, New York, N.Y.

[21] Appl. No.: 460,417

[22] Filed: Jan. 24, 1983

[30] Foreign Application Priority Data

Feb. 17, 1982 [NL] Netherlands .................. 8200616

[51] Int. Cl.³ ............................................ H02P 13/22
[52] U.S. Cl. ...................................... 363/19; 358/190; 363/49
[58] Field of Search ................ 363/19, 49; 358/190

[56] References Cited

U.S. PATENT DOCUMENTS 4,361,865 11/1982 Shono .................... 363/19

FOREIGN PATENT DOCUMENTS 2624965 12/1977 Fed. Rep. of Germany ...... 358/190
12862 2/1981 Japan ................................ 363/19

OTHER PUBLICATIONS

Sendrane, "DC Voltage Converter for Auxiliary Voltage Production", (English Title), Elektronik (Germany) No. 14, pp. 75, 76, (1981).

*Primary Examiner*—William H. Beha, Jr.
*Attorney, Agent, or Firm*—Robert T. Mayer; Bernard Franzblau

[57] ABSTRACT

A switched-mode self-oscillating supply voltage circuit for converting an input voltage into an output d.c. voltage which is substantially independent of variations of the input voltage and/or a load connected to the output voltage. The circuit comprises a first controllable switch connected in series with a transformer winding and a second controllable switch for turning-off the first switch. The conduction period of the first switch is controlled by means of a control voltage present on a control electrode of the second switch. The circuit can be switched-over to a stand-up state in which the energy supplied to the load is reduced to zero. A starting network is connected between the input voltage and the second switch so that the current therein flows through the second switch during the period of time this switch conducts and does not flow to the control electode of the first switch in the stand-by state.

4 Claims, 1 Drawing Figure

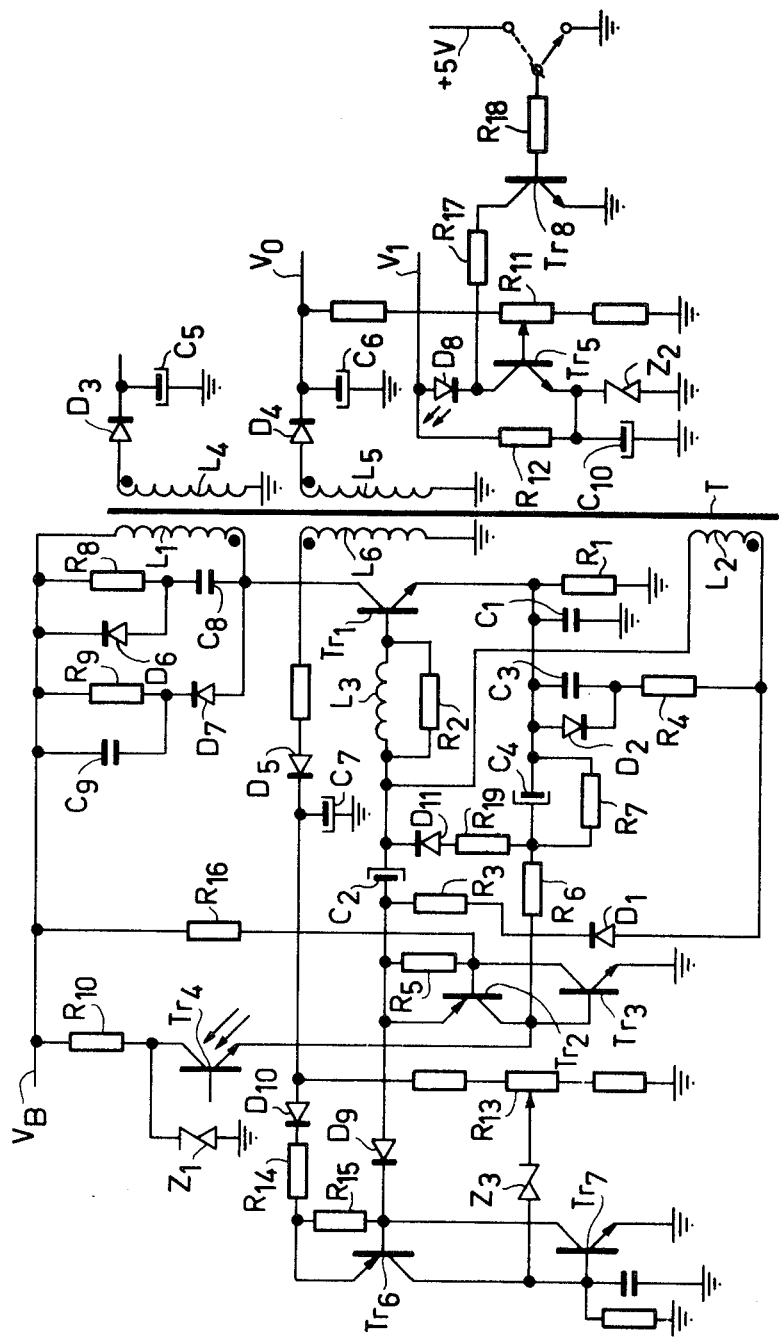

SWITCHED-MODE SELF OSCILLATING SUPPLY VOLTAGE CIRCUIT

The invention relates to a switched-mode self-oscillating supply voltage circuit for converting an input voltage into an output d.c. voltage which is substantially independent of variations of the input voltage and/or of a load connected to the terminals of the output voltage. This circuit comprises a transformer having a primary and a feedback winding and a first controllable switch arranged in series with the primary winding. The series arrangement thus formed is coupled between the terminals of the input voltage. A second controllable switch which is coupled via a turnoff capacitor to the control electrode of the first switch to turn it off. The feedback winding is coupled to this control electrode and the primary winding is coupled via a rectifier to an output capacitor the terminals of which are the terminals for the output voltage. An output voltage-dependent control voltage is present on a control electrode of the second switch for controlling the conduction period of the first switch. The circuit is switchable between an operating state and a stand-by state in which relative to the operating state the energy supplied to the load is considerably reduced, and the circuit further comprises a starting network connected to a terminal for the input voltage.

Such a supply voltage circuit is disclosed in German Patent Application No. 2,651,196. With this prior art circuit supply energy can be applied in the operating state to the different portions of a television receiver. In the stand-by state the majority of the output voltages of the circuit are so low that the receiver is substantially in the switched-off condition. In the prior art circuit the starting network is formed by a resistor connected to the unstabilized input voltage and through which on turn-on of the circuit a current flows via the feedback winding to the control electrode of the first controllable switch, which is a switching transistor, and brings it to and maintains it in the conductive state, as a result of which the circuit can start.

In the stand-by state the transistor is non-conducting in a large part of the period of the generated oscillation so that little energy is stored in the transformer. However, the starting resistor is connected via a diode to the second controllable switch, which is a thyristor. As the sum of the voltages across these elements is higher than the base-emitter threshold voltage of the transistor, the diode and the thyristor cannot simultaneously carry current. This implies that current flows through the starting resistor to the base of the transistor via the feedback winding after a capacitor connected to the feedback winding has been charged.

The invention has for its object to provide an improved circuit of the same type in which in the stand-by state the supply energy applied to the load is reduced to zero. The prior art circuit cannot be improved in this respect without the use of mechanical switches, for example relays. According to the invention, the switched-mode self-oscillating supply voltage circuit does not comprise such relays and is characterized in that it further comprises means for adjusting the control voltage in the stand-by state to a value at which the first controllable switch is cut-off. A connection which carries current during the conduction period of the second controllable switch is provided between the starting network and said second switch while a connection present between the starting network and the control electrode of the first switch does not carry current in the stand-by state.

The invention is based on the recognition that the prior art supply voltage circuit cannot oscillate, so that the energy supplied by it is zero, if the control voltage obtains a value as referred to, while the starting network is connected in such a manner that in the stand-by state no current can flow through it to the control electrode of the first controllable switch.

It should be noted that in the said German Patent Application the starting network is in the form of a resistor which is connected to an unstabilized input d.c. voltage. It is, however, known, for example, from German Patent Specification No. 2,417,628 to employ for this purpose a rectifier network connected to an a.c. voltage from which the said input d.c. voltage is derived by rectification.

The invention will now be further described by way of example with reference to the accompanying drawing, which shows a basic circuit diagram of a switched-mode self-oscillating supply voltage circuit.

The self-oscillating supply circuit shown in the FIGURE comprises a npn-switching transistor Tr1 having its collector connected to the primary winding L1 of a transformer T, while the emitter is connected to ground via a small resistor R1, for example 1.5 Ohm. Resistor R1 is decoupled for the high frequencies by means of a 150 nF capacitor C1. One end of winding L1 is connected to a conductor which carries an unstabilized input d.c. voltage $V_B$ of, for example, 300 V. Voltage $V_B$ has a negative rail connected to ground and is derived from the electric power supply by rectification. One end of a feedback winding L2 is connected to the base of transistor Tr1 via the parallel arrangement of a small inductance L3 and a damping resistor R2. A terminal of a 47 μF capacitor C2 is connected to the junction of the elements L2, L3 and R2. The series arrangement of a diode D1 and a 2.2 Ohm-limiting resistor R3 is arranged between the other terminal of capacitor C2 and the other end of winding L2 and the series arrangement of a resistor R4 of 12 Ohm and a diode D2 is arranged between the same end of winding L2 and the emitter of transistor Tr1. A 150 nF capacitor C3 is connected in parallel with diode D2. The anode of diode D1 is connected to that end of winding L2 which is not connected to capacitor C2, while the anode of diode D2 is connected to the emitter of transistor Tr1. In the FIGURE the winding sense of windings L1 and L2 is indicated by means of dots.

The junction of capacitor C2 and resistor R3 is connected to a 100 Ohm resistor R5 and to the emitter of a pnp-transistor Tr2. The base of transistor Tr2 is connected to the other terminal of resistor R5 and to the collector of an npn-transistor Tr3, whose emitter is connected to ground. The base of Tr3 is connected to the collector of transistor Tr2. Transistors Tr2 and Tr3 form an artificial thyristor, i.e. a controllable diode whose anode is the emitter of transistor Tr2 while the cathode is the emitter of transistor Tr3. The base of transistor Tr2 is the anode gate and the base of transistor Tr3 is the cathode gate of the thyristor formed. Between the last-mentioned base and the emitter of transistor Tr1 there is arranged the series network of a 2.2 kOhm resistor R6 with the parallel arrangement of a 2.2 kOhm resistor R7 and a 100 μF capacitor C4. The series arrangement of a diode D11 and a 220 Ohm limiting resistor R19 is arranged between the junction of components R6, R7 and C4 and the junction of components C2, L2, R2 and L3. The cathode of diode D11 is connected to capacitor C2.

Because of the feedback the described circuit oscillates independently as soon as the steady state is achieved. It will be described hereinafter how this state is obtained. During the time transistor Tr1 conducts the current flowing through the resistor R1 increases linearly. The resistor R4 then partly determines the base current of transistor Tr1. Capacitor C4 and resistor R7 form a voltage source the voltage of which is subtracted from the voltage drop across resistor R1. As soon as the voltage on the base of transistor Tr3 is equal to approximately 0.7 V this transistor becomes conductive, as a result of which the thyristor formed by transistors Tr2 and Tr3 becomes rapidly conductive and remains so. Across capacitor C2 there is a negative voltage by means of which transistor Tr1 is turned off. The inverse base current thereof flows through thyristor Tr2, Tr3. This causes charge to be withdrawn from capacitor C2, while the charge carriers stored in transistor Tr1 are removed with the aid of inductance L3. As soon as the collector current of transistor Tr1 has been turned off, the voltage across winding L2 reverses its polarity, which current recharges the capacitor. Now the voltage at the junction of components C2, R3 and R5 is negative, causing thyristor Tr2, Tr3 to extinguish.

Secondary windings L4, L5 and L6 are provided on the core of transformer T with the indicated winding senses. When transistor Tr1 is turned off, a current which recharges a smoothing capacitor C5, C6 or C7 via a rectifier D3, D4 or D5 flows through each of these windings. The voltages across these capacitors are the output voltages of the supply circuit for loads connectable thereto. These loads, which are not shown in the FIGURE, are, for example, portions of a television receiver.

In parallel with winding L1 there is the series network of a 2.2 nF tuning capacitor C8 and a 100 Ohm limiting resistor R8. The anode of a diode D6 is connected to the junction of components R8 and C8, while the cathode is connected to the other terminal of resistor R8. Winding L1 and capacitor C8 form a resonant circuit across which an oscillation is produced after windings L4, L5 and L6 have become currentless. At a later instant the current through circuit L1, C8 reverses its direction. As a result thereof a current is generated in winding L2 which flows via diode D2 and resistor R4 to the base of transistor Tr1 and makes this transistor conductive and maintains it in this state. The dissipation in resistor R8 is reduced by means of diode D6. A clamping network formed by the parallel arrangement of a 22 kOhm resistor R9 and a 120 nF capacitor C9 is arranged in series with a diode D7. This whole assembly is in parallel with winding L1 and cuts-off parasitic oscillations which would be produced during the period of time in which transistor Tr1 is non-conductive. The output voltages of the supply circuit are kept substantially constant in spite of variations of voltage $V_B$ and/or the loads, thanks to a control of the turning-on instant of thyrisistor Tr2, Tr3. For this purpose the emitter of a light-sensitive transistor Tr4 is connected to the base of transistor Tr3. The collector of transistor Tr4 is connected via a resistor R10 to the conductor which carries the voltage $V_B$ and to a Zener diode Z1 which has a positive voltage of approximately 7.5 V, while the base is unconnected. The other end of diode Z1 is connected to ground. A light-emitting diode D8, whose cathode is connected to the collector of an npn-transistor Tr5, is optically coupled to transistor Tr4. By means of a potentiometer R11 the base of transistor Tr5 can be adjusted to a d.c. voltage which is derived from the voltage $V_0$ of approximately 130 V across capacitor C6. The anode of diode D8 is connected to a d.c. voltage $V_1$ of approximately 13 V. A resistor R12 is also connected to voltage $V_1$, the other end of the resistor being connected to the emitter of transistor Tr5, to the cathode of a Zener diode Z2 which has a voltage of approximately 7.5 V and to a smoothing capacitor C10. The other ends of diode Z2 and capacitor C10 are connected to ground. Voltage V1 can be generated by means of a transformer connected to the electric AC supply and a rectifier, which are not shown for the sake of simplicity, more specifically for a remote control to which constantly supply energy is always applied, even when the majority of the components of the receiver in what is referred to as the stand-by state are not supplied with supply energy.

A portion of voltage $V_0$ is compared with the voltage of diode Z2 by means of transistor Tr5. The measured difference determines the collector current of transistor Tr5 and consequently the emitter current of transistor Tr4. This emitter current produces across resistor R6 a voltage drop whose polarity is the opposite of the polarity of the voltage source formed by resistor R7 and capacitor C4. Under the influence of this voltage drop the turn-on instant of thyristor Tr2, Tr3 is controlled as a function of voltage $V_0$. If, for example, voltage $V_0$ tends to decrease owing to an increasing load thereon and/or in response to a decrease in voltage $V_B$, then the collector current of transistor Tr5 decreases and consequently also the said voltage drop. Thyristor Tr2, Tr3 is turned on at a later instant than would otherwise be the case, causing transistor Tr1 to be cut-off at a later instant. The final value of the collector current of this transistor is consequently higher. Consequently, the ratio of the time interval in which transistor Tr1 is conductive to the entire period, commonly referred to as the duty cycle, increases, while the frequency decreases.

The circuit is protected from overvoltage. This is ensured by a thyristor which is formed by a pnp-transistor Tr6 and an npn-transistor Tr7. The anode of a diode D9 is connected to the junction of components R3 and C2 and the cathode to the base of transistor Tr6 and to the collector of transistor Tr7. The base of transistor Tr7, which base is connected to the collector of transistor Tr6, is connected via a zener diode Z3 to a voltage which, by means of a potentiometer R13 is adjusted to a value derived from the voltage across capacitor C7. The emitter of transistor Tr6 also is connected to the voltage of capacitor C7, more specifically via a resistor R14 and a diode D10. If this voltage increases to above a predetermined value then thyristor Tr6, Tr7 becomes conductive. Since the emitter of transistor Tr7 is connected to ground, the voltage at its collector becomes very low, as a result of which diode D9 becomes conductive, which keeps transistor Tr1 in the non-conducting state. This situation is maintained as long as thyristor Tr6, Tr7 continues to conduct. This conduction time is predominantly determined by the values of capacitor C7, resistor R14 and a resistor R15 connected between the base and the emitter of transistor Tr6. A thyristor is advantageously used here to render it possible to switch off a large current even with a low level signal and to obtain the required hysteresis.

The circuit comprises a 1 MOhm starting resistor R16, one end of which is connected to the base of transistor Tr2 and the other end to the conductor which carries the voltage $V_B$. Upon turn-on of the circuit current flows through resistors R16 and R5 and through capacitor C2, which has as yet no charge, to the base of transistor Tr1. The voltage drop thus produced across resistor R5 keeps transistor Tr2, and consequently also transistor Tr3, in the non-conductive state, while transistor Tr1 is made conductive and is maintained so by this current. Current also flows through winding L2. In this manner the circuit can start as energy is built up in transformer T.

The supply circuit can be brought into the stand-by state by making an npn-transistor Tr8, which is non-conductive in the operating state, conductive. The emitter of transistor Tr8 is connected to ground while the collector is connected to the collector of transistor Tr5 via a 1.8 kOhm resistor R17. A resistor R18 has one end connected to the base of transistor Tr8 and the other end, either in the operating state to ground, or in the stand-by state to a positive voltage of, for example, 5 V. Transistor Tr8 conducts in response to this voltage. An additional, large current flows through diode D8 and consequently also through transistor Tr4, resulting in thyristor Tr2, Tr3 being made conductive and transistor Tr1 being made non-conductive and maintained so. So to all appearances a large control current is obtained causing the duty cycle to be reduced to zero. A condition for a correct operation is that the emitter current of transistor Tr4 be sufficiently large in all circumstances, which implies that the voltage drop produced across resistor R6 by this current is always higher than the sum of the voltage across voltage source R7, C4, of the base-emitter threshold voltage of transistor Tr3 in the conductive state thereof, and of the voltage at the emitter of transistor Tr1. So the said voltage drop must be higher than the sum of the first two voltages, which corresponds to the worst dimensioning case in which the stand-by state is initiated while transistor Tr1 is in the non-conductive state.

If thyristor Tr2, Tr3 conducts, either in the operating state or in the stand-by state, current flows through resistor R16 via the collector emitter path of transistor Tr3 to ground. This current is too small to have any appreciable influence on the behaviour of the circuit. When thyristor Tr2, Tr3 does not conduct, the voltage on the left hand terminal of capacitor C2 is equal to approximately 1 V, while the voltage across the capacitor is approximately −4 V. So transistor Tr1 remains in the non-conductive state and a premature turn-on thereof cannot occur. If in the operating state transistor Tr1 conducts while thyristor Tr2, Tr3 is cut-off, then the current flows through resistor R16 in the same manner as it flows during the start to the base of transistor Tr1, but has relatively little influence as the base current caused by the energy stored in winding L2 is many times larger. If both transistor Tr1 and thyristor Tr2, Tr3 are non-conductive, then the current through resistor R16 flows through components R5, C2, L2, R4, C3 and R1. In this stand-by state capacitor C2 has indeed substantially no negative charge any longer but, in spite thereof, transistor Tr1 cannot become conductive since no current flows to its base. It will furthermore be noted that the circuit is protected in the event that thyristor Tr2, Tr3 has an interruption. Namely, in such a case the circuit cannot start.

In the foregoing a circuit is described which may be considered to be a switched-mode supply voltage circuit of the parallel ("flyback") type. It will be obvious that the invention may alternatively be used in supply voltage circuits of a different type, for example converters of the type commonly referred to as up-converters. It will also be obvious that transistor Tr1 may be replaced by an equivalent switch, for example a gate-turn-off switch.

What is claimed is:

1. A switched-mode self-oscillating supply voltage circuit for converting an input voltage into an output d.c. voltage which is substantially independent of variations of the input voltage and/or of a load connected to the terminals of the output voltage, comprising a transformer having a primary and a feedback winding, a first controllable switch connected in series with the primary winding, the series arrangement thus formed being coupled between terminals for the input voltage, a second controllable switch coupled via a turn-off capacitor to the control electrode of the first switch to turn it off, means coupling the feedback winding to said control electrode, a transformer winding being coupled via a rectifier to an output capacitor having terminals which supply the output voltage, an output voltage-dependent control voltage being present on a control electrode of the second switch for controlling the conduction period of the first switch, the circuit being switchable between an operating state and a stand-by state in which relative to the operating state the supply energy supplied to the load is considerably reduced, a starting network connected to a terminal for the input voltage, means for adjusting the control voltage in the stand-by state to a value at which the first controllable switch is cut-off, a connection which carries current during the conduction period for the second controllable switch being provided between the starting network and said second switch, and means providing a connection between the starting network and the control electrode of the first switch, which connection does not carry current in the stand-by state.

2. A supply voltage circuit as claimed in claim 1, further comprising a resistor included between the connection of the starting network to the second switch and a turn-off capacitor present in the connection to the control electrode of the first switch.

3. A supply voltage circuit as claimed in claim 2, characterized in that the second controllable switch comprises a thyristor having a main current path included in the control electrode connection of the first controllable switch, said thyristor having a first control gate electrode for adjusting the turn-off instant of the first switch and a second control electrode to which the starting network and the resistor are connected.

4. A supply voltage circuit as claimed in claim 1, characterized in that a resistor is included in the connection to the control electrode of the second controllable switch so that a current flows through said resistor in the stand-by state of a value sufficient to cut-off the first controllable switch.

* * * * *